US010634476B1

(12) United States Patent
Bautista et al.

(10) Patent No.: US 10,634,476 B1
(45) Date of Patent: Apr. 28, 2020

(54) MEASURING TOOL

(71) Applicant: Bautista Innovations, LLC, Cheyenne, WY (US)

(72) Inventors: Zachariah A. Bautista, Cheyenne, WY (US); Arnold Bautista, Cheyenne, WY (US); Andra Mara Maxwell, Denver, CO (US); Kristina Schock, Denver, CO (US); James Milo Meyer, Sheridan, WY (US); Travis Herbert Dooley, Laramie, WY (US); Thomas James Stypula, Sheridan, WY (US)

(73) Assignee: BAUTISTA INNOVATIONS, LLC, Cheyenne, WY (US)

(*) Notice: Subject to any disclaimer, the term of this patent is extended or adjusted under 35 U.S.C. 154(b) by 212 days.

(21) Appl. No.: 15/959,799

(22) Filed: Apr. 23, 2018

Related U.S. Application Data

(60) Provisional application No. 62/488,216, filed on Apr. 21, 2017.

(51) Int. Cl.
| | |
|---|---|
| *G01B 3/10* | (2020.01) |
| *G01B 3/1041* | (2020.01) |
| *G01B 3/56* | (2006.01) |
| *G01C 15/00* | (2006.01) |
| *G01B 3/1084* | (2020.01) |
| *G01C 9/28* | (2006.01) |
| *G01B 3/1092* | (2020.01) |

(52) U.S. Cl.
CPC ......... *G01B 3/1041* (2013.01); *G01B 3/1084* (2013.01); *G01B 3/566* (2013.01); *G01C 9/28* (2013.01); *G01C 15/004* (2013.01); *G01B 3/1092* (2020.01)

(58) Field of Classification Search
CPC ........ G01B 3/1084; B01C 9/28; G01C 15/004
USPC .............................. 33/275 R, 759, 760, 764
See application file for complete search history.

(56) References Cited

U.S. PATENT DOCUMENTS

| | | | |
|---|---|---|---|
| 4,438,538 | A | 3/1984 | Larsen |
| 4,506,446 | A | 3/1985 | Mitchell |
| 4,506,451 | A | 3/1985 | Hiltz |
| 4,700,489 | A | 10/1987 | Vasile |
| 5,230,159 | A | 7/1993 | Lipsey |
| 5,430,952 | A | 7/1995 | Betts |
| 5,594,993 | A | 1/1997 | Tager et al. |

(Continued)

FOREIGN PATENT DOCUMENTS

WO       2003/052343 A2    6/2003

*Primary Examiner* — George B Bennett
(74) *Attorney, Agent, or Firm* — Polson Intellectual Property Law, PC; Margaret Polson; Christopher Sylvain (57) ABSTRACT

A measuring tool comprising two tape measures. Each tape measure may be housed in a casing, and each casing may have an interface surface detachably coupled to the interface surface of the other casing. The measuring tool further comprises a level and a vertical laser. The vertical laser projects perpendicularly downward from the horizontal plane of the level. In a method to square a corner for a structure using the measuring tool, the user selects a first side to be perpendicular to a second side, calculates the diagonal therebetween using the desired lengths of the first side and the second side, attaches the measuring tapes to end points of the first side, tautly draws the measuring tapes to the lengths for the diagonal and the second side, and then marks the location using the level and vertical laser.

20 Claims, 8 Drawing Sheets

(56) References Cited

U.S. PATENT DOCUMENTS

| | | | |
|---|---|---|---|
| 5,894,675 A * | 4/1999 | Cericola | B43L 7/12 33/286 |
| 6,222,625 B1 | 4/2001 | Johnston | |
| 6,230,416 B1 | 5/2001 | Trigilio | |
| 6,338,204 B1 * | 1/2002 | Howle | B25H 7/04 33/755 |
| 6,388,204 B1 | 1/2002 | Howle | |
| 6,581,296 B2 | 6/2003 | Ponce | |
| D488,729 S | 4/2004 | Golaszewski et al. | |
| 6,789,329 B1 | 9/2004 | Hester | |
| 6,796,046 B1 | 9/2004 | May | |
| 6,928,029 B2 | 8/2005 | Rickman | |
| 7,024,791 B2 | 4/2006 | Marshall et al. | |
| 7,174,655 B1 * | 2/2007 | Gibbons | G01B 3/1084 33/227 |
| 7,260,899 B2 | 8/2007 | Jones | |
| 7,299,565 B2 | 11/2007 | Marshall et al. | |
| 7,334,344 B2 | 2/2008 | Scarborough | |
| 7,430,810 B2 | 10/2008 | Sergeyenko et al. | |
| 7,549,235 B2 | 6/2009 | Alders | |
| 2003/0000099 A1 * | 1/2003 | Wang | G01B 3/1084 33/760 |
| 2003/0110656 A1 | 6/2003 | Scarborough | |
| 2005/0028396 A1 | 2/2005 | Stauffer et al. | |
| 2012/0036727 A1 * | 2/2012 | McCarthy | B43K 23/001 33/760 |
| 2012/0042527 A1 * | 2/2012 | Olsen | G01C 15/12 33/228 |
| 2013/0167387 A1 * | 7/2013 | Lueck | G01C 9/28 33/374 |
| 2014/0237833 A1 * | 8/2014 | Schubert | G01C 9/06 33/365 |
| 2015/0204666 A1 * | 7/2015 | Hill | G01C 15/004 33/228 |
| 2018/0120080 A1 * | 5/2018 | Park | G01B 3/1084 |
| 2019/0063921 A1 * | 2/2019 | George | G01C 3/06 |

* cited by examiner

MEASURING TOOL

REFERENCE TO RELATED APPLICATIONS

This application claims the benefit of U.S. provisional patent application Ser. No. 62/488,216 filed Apr. 21, 2017, which is incorporated by reference herein for all purposes.

BACKGROUND

Multiple workers and/or inefficient steps are typically required in known methods to square a building foundation, driveway, sidewalk, framework, deck, patio or the like. The terms "to square" or "squaring a corner" conventionally refer to providing a right angle (90°) between two sides or edges of a structure that are intended to be perpendicular to one another. For example, in setting a first corner, one worker may remain at the desired juncture point of the two perpendicular sides with an angle tool to maintain a 90° angle, while one or two other workers would extend string and tape measures to the desired distance from the juncture point and then mark the termination point for each side, often by eye. However, this technique is tedious, inaccurate and requires multiple workers. In another method, a 3-4-5 corner technique based on the Pythagorean theorem may be used by a single worker to lay out a right corner using three stakes, string and a tape measure, but again this method is tedious and time consuming. What is needed is a quick, accurate, easy, and efficient measurement tool that can be used by a single worker to square a corner for a structure to be laid.

The foregoing examples of the related art and limitations therewith are intended to be illustrative and not exclusive. Other limitations of the related art will become apparent to those of skill in the art upon a reading of the specification and a study of the drawings.

SUMMARY

The present disclosure relates to a measuring tool. One aspect of the present disclosure is to provide a tool for quickly and accurately squaring a foundation, framework, driveway, deck or the like with only one worker. Another aspect of the present disclosure is to incorporate a simple method for using the measuring tool to square a structure to be laid. A further aspect is to allow components of the measuring tool to separate for conventional use thereof, and readily recouple for use according to the present disclosure. A further aspect is to provide an on-tool calculator for conveniently performing calculations on site, while also protecting against damage by arranging the calculator on a non-exterior facing surface by default. A further aspect is to provide a level and one or more lasers for readily and accurately marking desired points. A further aspect is to locate the center or opposite point along a circle.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The measuring tool comprises a top casing and a bottom casing. The top and bottom casings each have an exterior surface and an interface surface, wherein the interface surfaces are configured to be detachably coupled to one another. In some embodiments, one or more magnets are arranged on, or at least sufficiently proximate to, the interface surface of each casing to provide for magnetic coupling of the casings together. The one or more magnets may further be configured for at least one magnetic angle capture of the casings with respect to one another, such that the casing halves are securely attached when they are in a default position (overlapping and not rotated with respect to one another) and again when they are rotated a certain angular degree with respect to one another. The magnetic coupling of the casings may provide a magnetic angle capture when the casings are rotationally offset by 45°, 90°, and/or 180° for example. In other embodiments, the top casing and the bottom casing may be mechanically coupled together, rather than magnetically, and this coupling could also be configured for one or more mechanical angle captures like in the magnetic embodiments. It is also possible to provide for the detachable coupling of the top and bottom casings through a combination of different connection mechanisms.

Each of the top and bottom casings further has a tape measure comprising a measuring tape, a hook tab attached to an end of the measuring tape, and a mechanism for retracting the measuring tape back into the casing. For example, a manual reel may be provided to retract the measuring tape, or the measuring tape may be spring-loaded to automatically retract if a counterforce is not applied. The measuring tapes may also be able to be locked to prevent further extension or retraction when drawn to a desired length during use. The hook tab may be configured to swivel 360° relative to the measuring tape. In some embodiments, a calculator is positioned on one of the interface surfaces of the casings, which may help protect against damage to and unintentional activation of the calculator. The measuring tool may comprise a level and a vertical laser. The level may be provided on the upper exterior surface of the top casing, such that a user can respond to feedback from the level in manipulating the measuring tool into the horizontal plane of the level. The beam of the vertical laser may be arranged perpendicularly downward from the horizontal plane of the level for marking points on the ground. In some embodiments, the measuring tool may further comprise a horizontal laser. The horizontal laser may be configured to project its beam parallel to the horizontal plane of the level. Where the top and bottom casings are configured to couple together in at least a default position and another set position, the laser beam of the horizontal laser may be oriented to symmetrically bisect an angle formed by rotational displacement of the casings when the top casing is rotated relative to the bottom casing from the default position into the other set position, which configuration can be used to identify the opposite point of a circle or half-circle structure from the measuring tool, for example.

A method to square a foundation, framework, driveway, deck or the like using the measuring tool is also disclosed herein. The user selects a first side for squaring and measuring from. The first side may be defined by a preexisting structure or selected by design, but in either case, the user knows the length of the first side and the length of a second side to be arranged at a right angle to the first side. The user then calculates the diagonal using the lengths of the first and second sides, attaches the measuring tapes to each of the two end points of the first side, and tautly draws the measuring tapes to the correct lengths for the diagonal and the second side. The user then accurately marks the juncture point by using the level to position the tool in the horizontal plane and by activating the vertical laser to identify the point on the ground directly thereunder. If the structure is to be square or rectangular (i.e. the user is not mapping out a right triangle), the user may then flip the measurement values of each measuring tape to mark the location of the fourth corner in the same manner to complete the rectangular shape. In such cases, the measuring tape that was used for the length of the diagonal should be adjusted to the length of the second side, and the measuring tape that was used for the length of the second side should be adjusted to the length of the diagonal. This may be accomplished without ever detaching the measuring tapes from the end points of the first side.

In addition to the aspects and embodiments described above, further aspects and embodiments will become apparent by reference to the accompanying drawings and the detailed description forming a part of this specification.

BRIEF DESCRIPTION OF THE DRAWINGS

The present disclosure is described in greater detail below with reference to the following figures.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

FIGS. 1-4 show an embodiment of a measuring tool according to the present disclosure. The measuring tool 100 comprises a top casing 110 having an exterior surface 111 and an interface surface 112, and a bottom casing 120 having an exterior surface 121 and an interface surface 122. At least in the depicted embodiment, the casings 110, 120 have a generally teardrop shape. The interface surfaces 112, 122 may be configured to couple to each other as described below. When the two casings 110, 120 are in a default position (see FIGS. 1 and 2)—meaning the interface surfaces 112, 122 are coupled together and substantially or completely overlap—the exterior surfaces 111, 121 substantially or completely form the outer surfaces of the measuring tool 100. The default position may be characterized as having no rotation or 0° of rotation between the two casings 110, 120. Casings 110, 120 may be weatherproof or resistant in certain embodiments, particularly if the casing houses electronic components as described below.

Each of the casings 110, 120 forms a tape measure comprising an extendable measuring tape 130 coiled within its respective casing, and a hook tab 131 positioned on an end of the measuring tape 130 outside the casing. The measuring tape 130 is provided with distance markings and may be produced of any sufficiently durable and flexible material, such as metal for example. Different lengths of measuring tape (e.g., 10-foot tap, 25-foot tape, 50-foot tape, 100-foot tape, etc.) may be provided within the casings 110, 120 and interchanged depending on the measurement requirements for a specific application. Further, the size of the measuring tool 100 itself could be scaled to accommodate even larger or smaller coils of measuring tape 130 if necessary. Since the measuring tapes 130 may be arranged horizontally parallel to one another within their respective casings 110, 120 and adjacent to one another along the vertical axis of the measuring tool 100 (see FIG. 4), the measuring tapes 130 can exit their respective casings 110, 120 through openings located at the same or approximately the same point relative to the horizontal plane of the tool 100 and/or level 150 described below. The hook tabs 131 prevent the measuring tapes 130 from completely retracting into the casings 110, 120, and may be used to secure its measuring tape 130 to a fixed point. In some embodiments (not shown), a magnet may additionally or alternatively be provided at the end of the measuring tape 130 for easy attachment to magnetic materials (e.g., certain metals). In some embodiments, the hook tab 131 can be connected to the measuring tape 130 by a swivel which allows the hook tab 131 to rotate 360° relative to the longitudinal axis of the measuring tape 130.

Figure 1:
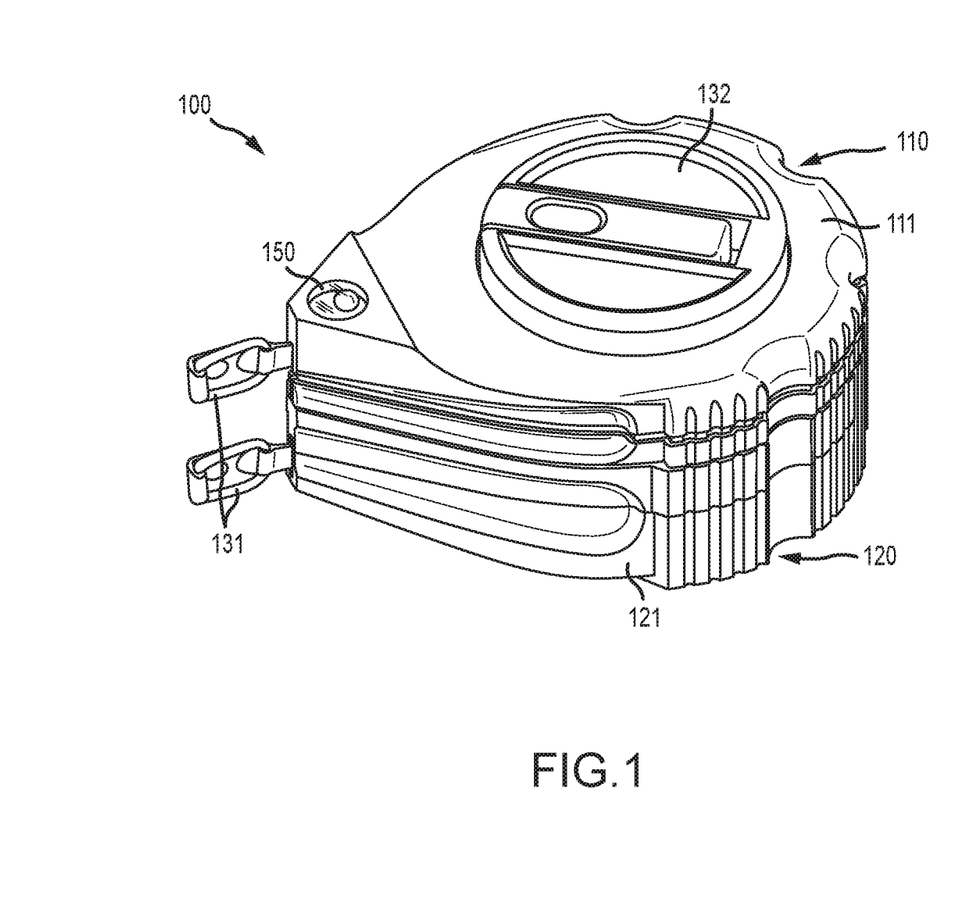
FIG. 1 shows a top perspective view of a measuring tool according to the present disclosure.
Figure 2:
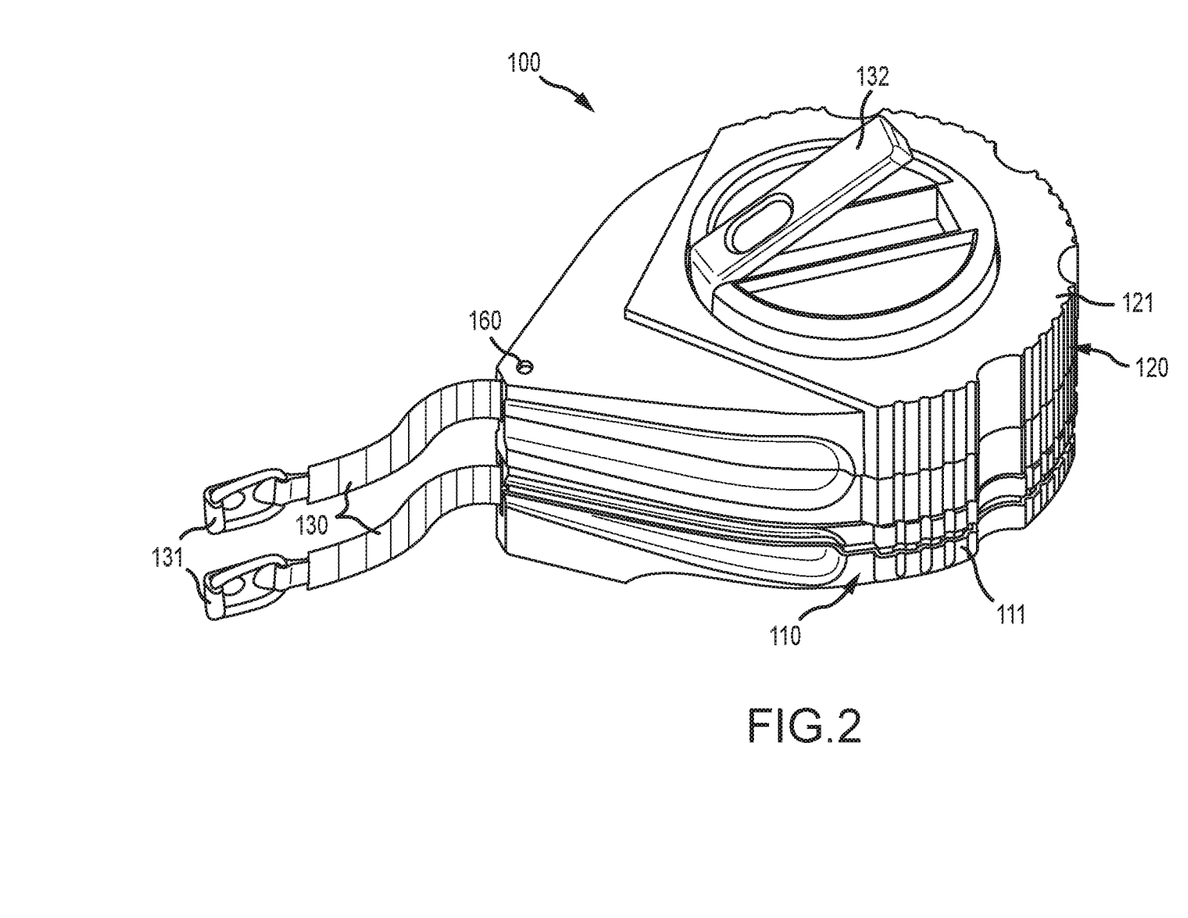
FIG. 2 shows a bottom perspective view of the measuring tool of FIG. 1 with the measuring tapes and reel partially extended out.

In the depicted embodiment, the tape measure further comprises a reel 132 for retracting an extended measuring tape 130 back into the casing 110, 120. In a stored position, the handle of the reel 132 may be arranged within a recess formed in the body of the reel 132 on the exterior casing surface 111, 121 (see FIG. 1). During use, the handle of the reel 132 may be pivoted out from the recess, thereby forming a grip for the user to manually turn the reel 132 to draw the extended measuring tape 130 back into the casing 110, 120 (see FIG. 2 showing the handle pivoted partially outward). In other embodiments, the measuring tape 130 may be spring-loaded to automatically retract back into the casing when a sufficient counterforce is not applied (e.g., by a user, attachment point, or locking mechanism of the tape measure). The measuring tool may further comprise a locking mechanism that acts on the measuring tape 130 and/or the reel 132 to prevent the measuring tape 130 from further extending from or retracting into its casing 110, 120 when the measuring tape 130 is drawn out to a desired length during use. For example, the locking mechanism may be provided by a push button or other structure positioned on the exterior surface 111, 121 of the casing 110, 120 that the user can push, slide or otherwise switch to cause a clamp or similar fastener to engage or disengage the tape measure 130. In this way, the measuring tape 130 can be changed between a "locked" and "unlocked" configuration as needed. Many different locking mechanisms are of course possible.

Figure 3:
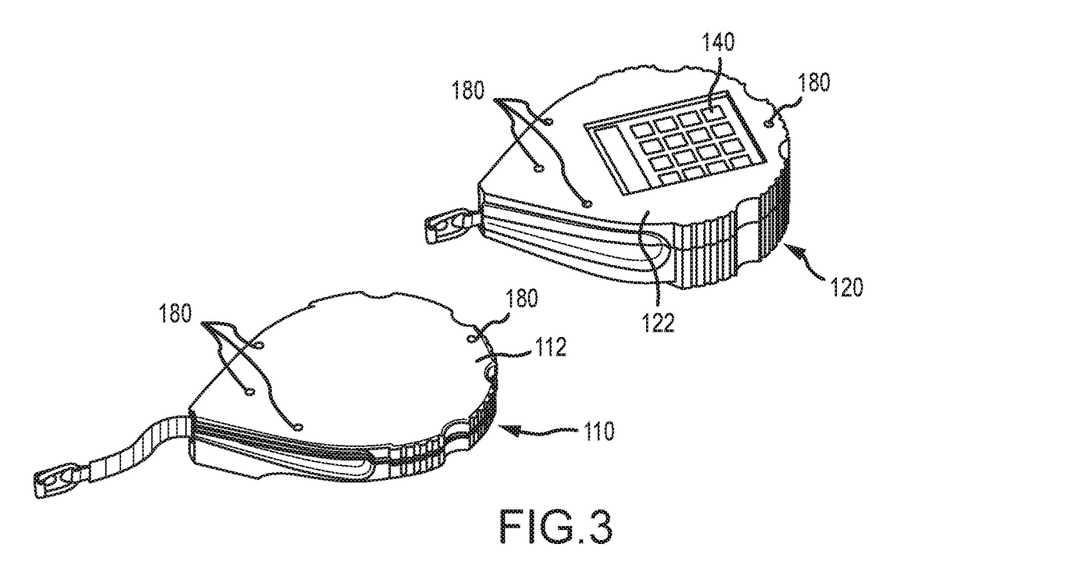
FIG. 3 shows a perspective view of the interface surfaces of the top and bottom casings of the measuring tool of FIG. 1.
Figure 4:
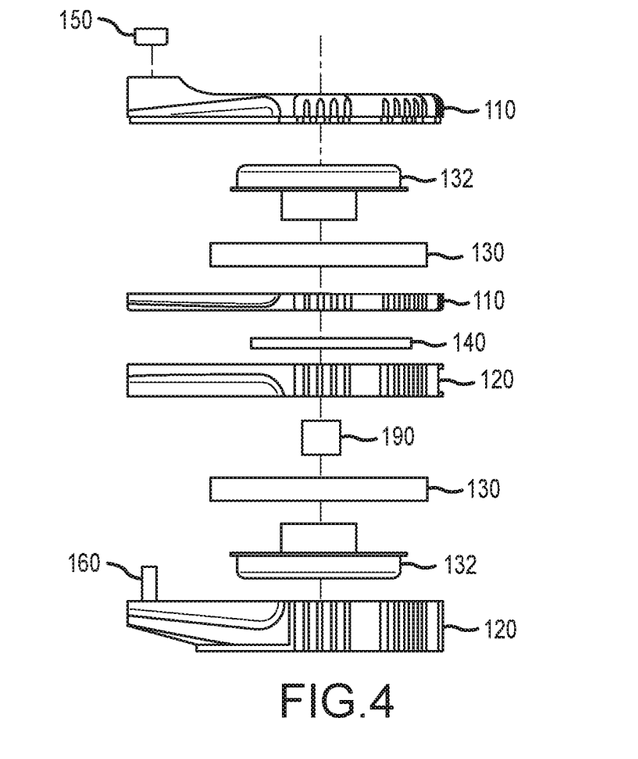
FIG. 4 shows an exploded side view of the measuring tool of FIG. 1.

As seen in FIGS. 3 and 4, the measuring tool 100 may further comprise a calculator 140. The calculator 140 may be specifically configured for common construction calculations such as, for example, inputting and determining rise, run, diagonal, pitch, conversions, etc. Here, the calculator 140 is shown positioned on the interface surface 122 of the bottom casing 120. However, the calculator 140 could instead be positioned on the interface surface 112 of the top casing 110 as well. In such an embodiment, the top casing 110 may be relatively thicker than the bottom casing 120 in order to accommodate the calculator 140, as compared to the depicted embodiment where the bottom casing 120 is relatively thicker than the top casing 110. In other embodiments, the casings 110, 120 may be the same or substantially the same in size, for example, if the calculator only requires minimal space or if the casings are not optimized dimensionally. The placement of the calculator 140 on one of the interface surfaces 112, 122 helps protect the calculator 140 against exterior contact damage and unintentional input—which may help extend the product life and battery life expectancies—since the interface surfaces 112, 122 can otherwise remain coupled in the default position and thereby protectively enclose the calculator 140, except when the calculator 140 is being used or if the user elects to only use one of the casings 110, 120 in a conventional manner as a single-tape measuring tool. Other structural arrangements are also possible, for example, as the calculator 140 could alternatively be positioned on an exterior surface 121, 131 of the measuring tool 100. However, the placement of the calculator 140 on the bottom casing 120 may augment the stability and balance of a user's grip when the measuring tool 100 is held in the palm of a user's hand depending on the embodiment, since the potentially bulkier and heavier bottom casing 120 housing the calculator 140 (relative to the top casing 110) would be held directly by the user. Moreover, certain embodiments may omit the calculator 140 altogether, whereby the user may instead perform any necessary calculations on another device and yet still practice a method of using the measuring tool 100 according to the present disclosure in the same manner as otherwise described herein.

The measuring tool 100 further comprises a level 150 and a vertical laser 160. The level 150 may be a spirit level, such as a bullseye bubble level or tubular bubble level, positioned on the exterior surface 111 of the casing 110 (see FIG. 1), which allows a user to make adjustments in response to visual feedback from the level 150 while manipulating the tool 100 to find the horizontal plane of the level 150. In the depicted embodiment, the level 150 is located directly adjacent to where the measuring tapes 130 exit the tool 100 on the top surface of the casing 110, although the level 150 could also be positioned at other locations as well. The vertical laser 160 is provided on the opposite side of the measuring tool 100 as the level 150 (see FIG. 2). The vertical laser 160 is configured to project its beam perpendicular to the horizontal plane of the level 150. When the measuring tool 100 is correctly aligned relative to the horizontal plane of the level 150, the beam of the vertical laser 160 will be projected downward to the ground along a vertical axis perpendicular to the horizontal plane. Therefore, the vertical laser 160 may be positioned on the exterior surface 121 of the bottom casing 120 directly adjacent to where the measuring tapes 130 exit the measuring tool 100, so as to minimize the horizontal displacement of the beam of the vertical laser 160 relative to the point at which the measuring tapes 130 exit the tool 100. In the depicted embodiment, the vertical laser 160 is positioned on the bottom exterior surface of the bottom casing 120 at the tip of the teardrop shape.

Figure 9:
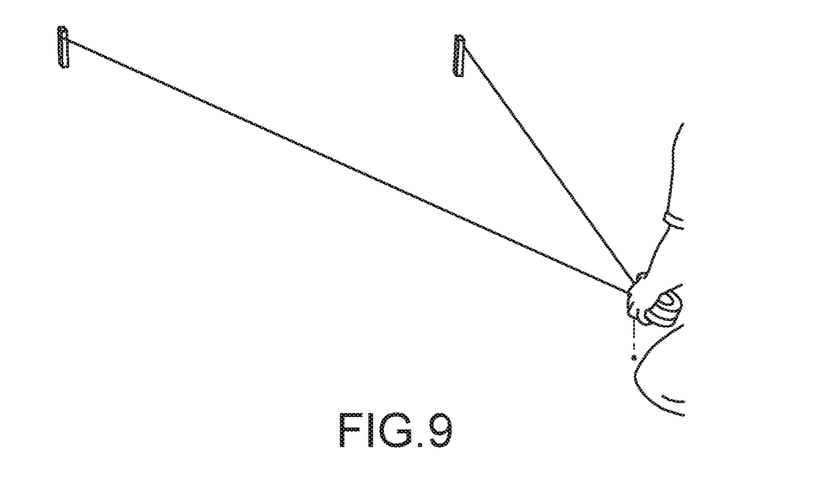

The measuring tool 100 may further comprise a horizontal laser 170 in certain embodiments (see FIG. 9). The horizontal laser 170 is configured to project its laser beam parallel to the horizontal plane of the level 150. In the depicted embodiment, the horizontal laser 170 is positioned on the lateral side of the exterior surface 111 of the top casing 110. However, the horizontal laser 170 could also be arranged on the bottom casing 120. Further, both casings 110, 120 could be provided with horizontal lasers 170. As described below, the beam of the horizontal laser 170 may be configured to bisect the angular displacement of the casings 110, 120 produced when the casings are rotated relative to each other from the default position into a second set position.

Referring to FIG. 3, a plurality of magnets 180 may be provided on each of the interface surfaces 112, 122 of the casings 110, 120. The magnets 180 are configured to produce a magnetic coupling of the interface surfaces 112, 122 when they are aligned and placed together. The magnets 180 may be embedded or otherwise mounted on the interface surfaces 112, 122 as in the depicted embodiment, or arranged within the interior of the casings 110, 120 provided that the magnetic connection is otherwise adequately formed, or any combination thereof. The magnets 180 should be strong enough to keep the casings 110, 120 attached together when minor external forces are applied, yet still enable a user to intentionally separate or rotate the casings 110, 120 with respect to one another. As seen in FIGS. 1 and 2, the top casing 110 and the bottom casing 120 are interfacing at the default position characterized as having 0° of rotation between the two casings 110, 120. However, the magnets 180 may also be arranged on the interface surfaces 112, 122 to form the magnetic coupling between the top and bottom casings 110, 120 in multiple positions. For example, the plurality of magnets 180 may be configured to create a magnetic angle capture when one of the casings 110, 120 is rotated, for example, 45°, 90°, and/or 180° from the default position with respect to the other casing.

Figure 5:
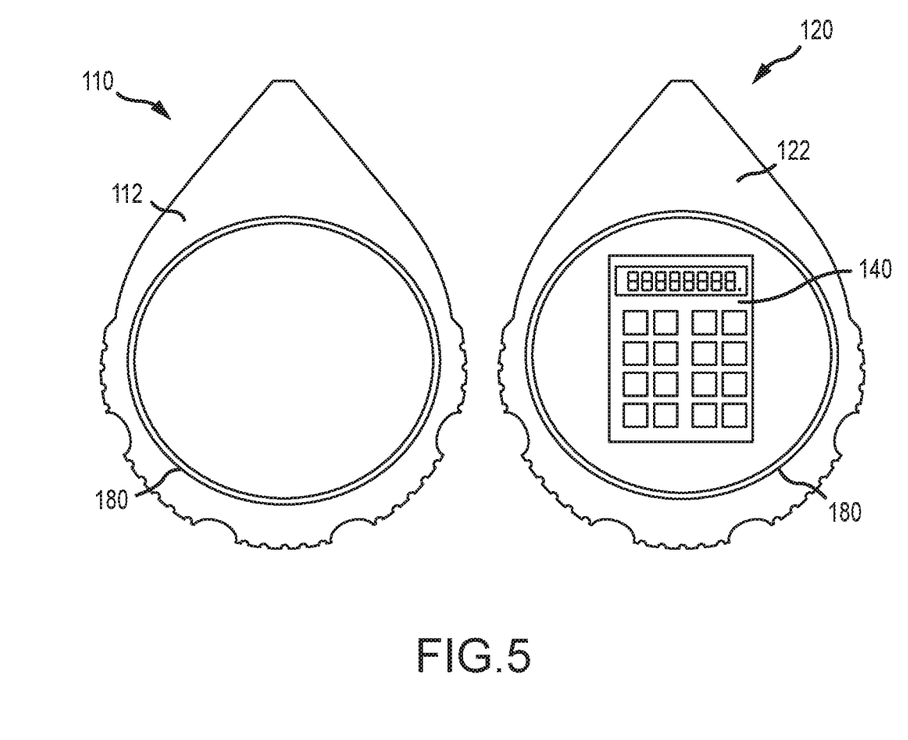
FIG. 5 shows a plan view of the interface surfaces of another embodiment of a measuring tool according to the present disclosure.

While a particular arrangement for the positioning of the plurality of magnets 180 on the interface surfaces 112, 122 is depicted in FIG. 3, a variety of configurations are possible and therefore the scope of present disclosure is not so limited. Moreover, the plurality of magnets 180 need not comprise individual structures as in the previous embodiment. For instance, the plurality of magnets 180 could be provided by magnetically-mated rings configured to magnetically coupled together (see FIG. 5). The magnets 180 could form the entirety of the ring structures in some embodiments. In other embodiments, only certain sections of the ring structure could be provided with magnets 180. For example, magnetic sections of the ring may alternate with non-magnetic sections of the ring, with the magnetic sections being arranged at specific distances from each other to provide magnetic angle capture points when the casings 110, 120 (and therefore the mated rings) are rotated to different positions relative to one other, such as 45°, 90°, and/or 180° from the default position, for example. Other arrangements and structural configurations for the plurality of magnets may also be used within the scope and spirit of the present disclosure.

It should further be appreciated that corresponding magnets 180 of the respective casings 110, 120 could both be permanent magnets or, alternatively, only one of the magnets 180 may be a permanent magnet while the other "magnet" of the pair which achieves a magnetic connection therebetween is produced of a ferromagnetic material (the term "magnet" merely used for the convenience of description in that case, but nonetheless referring to and encompassing the ferromagnetic structures of such embodiments).

In other embodiments of a measuring tool according to the present disclosure (not shown), the casings 110, 120 could instead be detachably coupled together, with or without angle capture, by other connection mechanisms. For example, the casings 110, 120 may be mechanically coupled together via snap-fit, latches, pins, etc. The positional arrangement of these mechanical connection structures may be configured to allow for one or more mechanical angle capture points when the casings 110, 120 are rotated to certain positions relative to one other, such as 45°, 90°, and/or 180° from the default position, for example. The detachable coupling of the casings 110, 120 could also be provided by a combination of magnetic and mechanical mechanisms in other embodiments.

Figure 6:
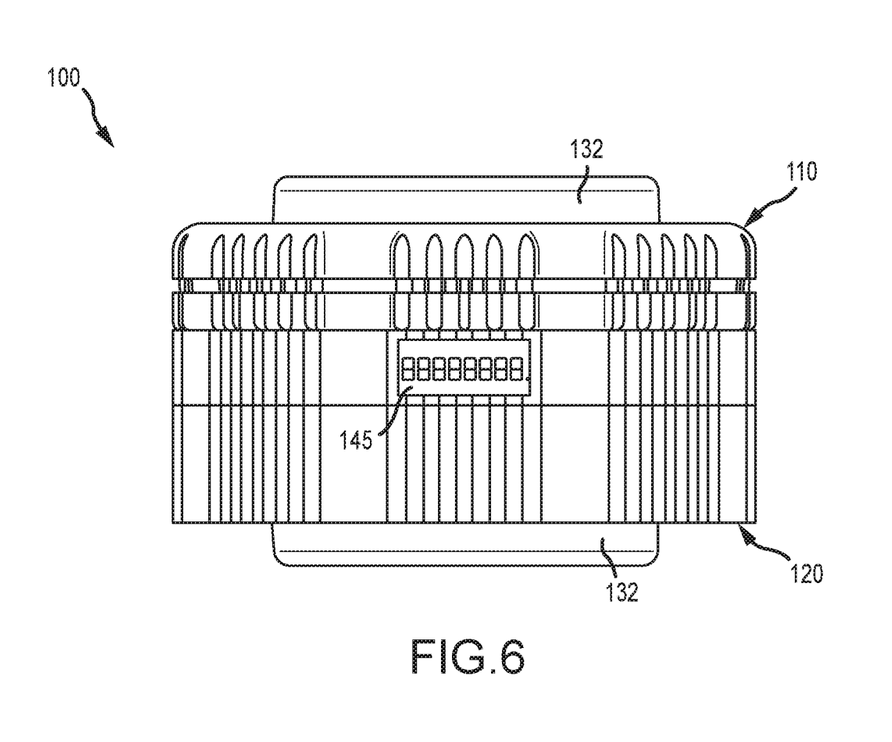
FIG. 6 shows a rear view of a measuring tool with an exterior calculator display.

As seen in FIG. 6, some embodiments of the measuring tool 100 may also comprise a secondary calculator display 145. The display 145 is communicatively linked to the calculator 140 and configured to display information from the same. For instance, the display 145 may display the information that would otherwise be shown on the calculator 140, such as the length of a diagonal calculated according to the method described below. In this way, the user can reference information displayed on the display 145 if the primary display of the calculator 140 is not readily visible, for example, when the measuring tool 100 is in the default position and the calculator 140 is enclosed by the interface surfaces 112, 122. The display 145 may be an LED display, LCD display, or the like; no limitation regarding the specific display type is intended nor should such limitation be inferred. In the depicted embodiment, the display 145 is positioned on the back, lateral side of the exterior surface 121 of the bottom casing 120. However, the display 145 could also be positioned in other locations on the exterior surface 111, 121 of the casing 110, 120 which houses the calculator 140 within the scope and spirit of the present disclosure.

One or more batteries 190 (see FIG. 4) may be provided within the casings 110, 120 to power the calculator 140, the display 145, and the lasers 160, 170 as necessary, depending on the embodiment. The one or more batteries 190 may be replaceable or rechargeable, for example, if the measuring tool 100 is fitted with a charging port (not shown). Other power sources for the electronic components such as solar powered could also be used within the scope and spirit of the present disclosure. It should be appreciated that one or more user input controls (e.g., buttons, switches, knobs, etc.) may be provided on the casings 110, 120 to control operation of the electronic components therein, such as an activation or on/off switches for the lasers 160, 170 or display 145, for example. The calculator 140, ancillary display 145, vertical laser 160, and/or horizontal laser 170 may also be configured to automatically turn-off to preserve battery life upon expiration of a control timer (e.g., 20 seconds) absent intervening user input in some embodiments.

In certain embodiments (not shown), the exterior surface 121 of the bottom casing 120 may further comprise a bolt sleeve configured to receive a bolt of a tripod. In this way, the measuring tool 100 may be securely mounted on the tripod. When the measuring tool 100 is mounted on the tripod, such that the measuring tool is arranged in the horizontal plane of the level 150, the beams of the lasers 160, 170 will be configured to project directly vertically downward and horizontally outward, respectively. In this way, mounting the measuring tool 100 to a tripod may help accurately pinpoint the juncture of a diagonal and a side of the structure using the vertical laser 160, as described according to the method below, since the user need not simultaneously balance the measuring tool 100 in the horizontal plane of the level 150 while marking the spot on the ground indicated by the vertical laser 160. Likewise, a user may activate the horizontal laser 170 to pinpoint locations within the same horizontal plane, and accurately mark such locations without requiring another person's assistance. In some embodiments, at least one of the exterior surfaces 111, 121 of the casings 110, 120 may also have a hook, clasp, or similar connection structure for attachment to a belt or strap (e.g., a knee strap) worn by a user. For example, the hook, clasp, or similar connection structure could be provided on the rear side of the casing 110, 120 opposite to where the measuring tapes 130 exit the measuring tool 100. In this way, the measuring tool 100 may be readily placed and stored on the user's belt or strap when not in use. Moreover, the measuring tool 100 could be connected to the belt or strap for use in a method according to the present disclosure as described below, thereby freeing the user's hands to carry other tools and accomplish other tasks at the same time.

Figure 7:
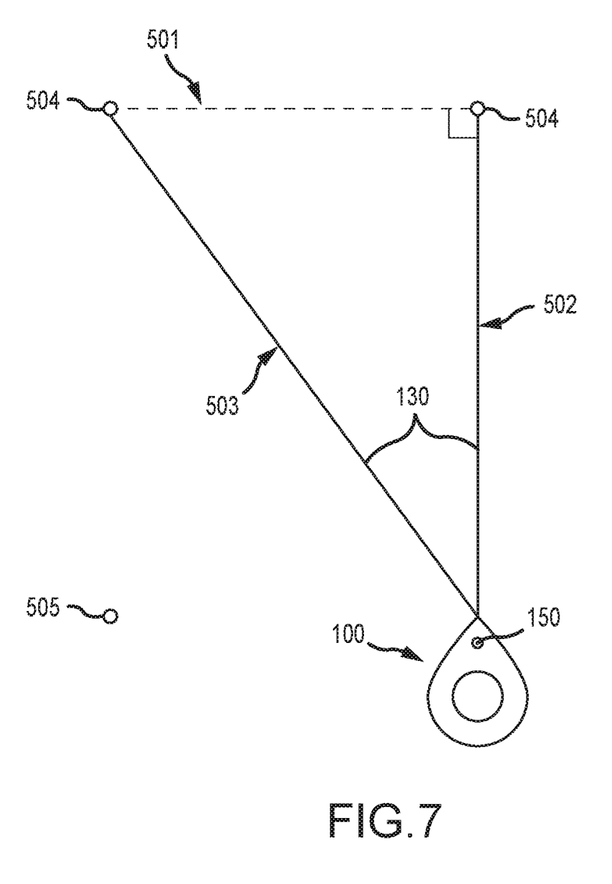
FIG. 7 shows a bird's-eye schematic diagram of a measuring tool according to the present disclosure being used to square a structure to be laid.
Figure 8:
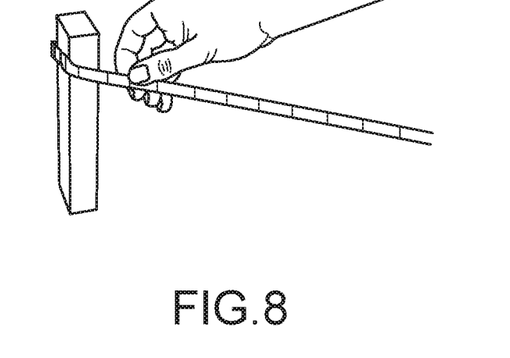
FIGS. 8 and 9 show steps for using a measuring tool according to FIG. 7.

FIG. 7 shows a top overview schematic diagram of a measuring tool 100 according to the present disclosure being used to square a right corner for a foundation, framework, driveway, deck or the like. In a preliminary step, the user knows the lengths of the perpendicular sides 501 and 502 of the structure by design, which are to form the length and the width of a square/rectangle or the legs of a right triangle, for example. The user may then use the on-tool calculator 140, or a separate calculator device depending on the embodiment, to find the length of the diagonal 503 (e.g., by inputting values for rise/run and determining diagonal). Next, the user securely attaches the hook tab 131 of each measuring tape 130 to one of the end points 504 of the first side 501. In this way, the first side 501 may be defined by an already existing structure, or the user may place stakes or other markers to delineate the first side 501 and provide attachment points for the hook tabs 131 (see FIG. 8). Although the hook tab 131 is shown being attached to the side of the stake in FIG. 8, the hook tab 131 could also be attached to the top surface of the stake—particularly if the hook tab 131 is configured to swivel relative to the measuring tape 130 as described above—which configuration may facilitate a more accurate placement of the hook tab 131 if the location of the end point 504 is known with respect to a horizontal surface.

In a following step, the user then simply moves the measuring tool 100, which draws out the measuring tapes 130, until one of the measuring tapes 130 indicates the calculated distance for diagonal 503 and the other measuring tape 130 indicates the desired distance for the second side 502. The user may pull the measuring tapes 130 taut to ensure that the measuring tool 100 is positioned over the correct location, i.e., so slack in the tapes 130 does not produce error. The user may then adjust the measuring tool 100 until the level 150 shows alignment with the horizontal plane, and activate the vertical laser 160 to identify exactly where on the ground to mark the juncture of the second side 502 and the diagonal 503 (see FIG. 9). Although the user is shown holding the measuring tool 100 in FIG. 9, the measuring tool 100 could also be attached to a belt or strap worn by the user—particularly if the measuring tool 100 comprises an eye-hook or similar structure as described above—which configuration may allow the user to use his or her body to position the measuring tool 100 into the correct location, thereby freeing the user's hands to install a stake, post, or other marking structure at that location in a single step. If the user is mapping out a square or rectangle (not just a right triangle), the user may then simply move to the location where the values of the second side 502 and the diagonal 503 indicated by each tape 130 are respectively switched, in order to find and mark the fourth or final corner 505 of the square/rectangular structure in the same manner, the fourth corner 505 being opposite the first right corner of the structure formed between the first side 501 and the second side 502, thereby accurately identifying the corner boundaries of the structure. This step may be done without needing to uncouple the hook tabs 131 from the end points 504 of the first side 501.

Accordingly, a method of using a measuring tool to provide a right angle between a first side and a second side of a structure to be laid, the first side having a first side length and the second side having a second side length, may comprise the steps of:

- determining, using the first side length and the second side length, a diagonal length of a diagonal forming a right triangle with the first side and the second side;
- attaching a first measuring tape of the measuring tool to a first end of the first side;
- attaching a second measuring tape of the measuring tool to a second end of the first side, the first end of the first side and the second end of the first side being separated by the first side length;
- displacing the measuring tool to a first location where the first measuring tape is tautly drawn to the diagonal side length and the second measuring tape is tautly drawn to the second side length;
- leveling the measuring tool at the first location using a level of the measuring tool, the level indicating orientation relative to a horizontal plane;
- activating a vertical laser of the measuring tool at the first location, the vertical laser downwardly projecting a laser beam which is substantially perpendicular to the horizontal plane of the level; and
- identifying marking a first point on the ground indicated by the laser beam of the vertical laser at the first location;
- wherein the first point on the ground, the first end of the first side, and the second end of the first side comprise the three corners of the right triangle.

Further still, a method may comprise the additional steps of:

- after marking the first point on the ground at the first location, displacing the measuring tool to a second location where the first measuring tape is tautly drawn to the second side length and the second measuring tape is tautly drawn to the diagonal length;
- leveling the measuring tool at the second location using the level of the measuring tool;
- activating the vertical laser of the measuring tool at the second location; and
- identifying or marking a second point on the ground indicated by the laser beam of the vertical laser at the second location;
- wherein the first point of the ground, the second point on the ground, the first end of the first side, and the second end of the first side comprise the four corners of a square or rectangle.

In the previous example, the user already knew the desired distances of the perpendicular sides 501, 502 and the angle therebetween (90°). If the user instead knows the lengths of the diagonal 503 and only one of these sides, the length of the other side may be readily calculated using the same method through rearrangement of the Pythagorean theorem equation ($a^2+b^2=c^2$). Further, if the user knows the desired values for certain sides and angles therebetween, even if not 90°, the corresponding lengths may be calculated via basic trigonometry (e.g., law of cosines, law of sines). In this way, the tool calculator 140 may be specifically configured for easier input to find the missing sides on-site. In other applications, no calculations may be necessary at all, as in the case where a user wants to stake out an equilateral triangle, since the distance between the secured hook tabs is known and the user can simply pull both measuring tapes to that distance. Accordingly, the present disclosure is not necessarily limited to marking out squares, rectangles, or right triangles, since the measuring tool 100 is capable of designating a wide variety of different structural shapes depending on the skill and needs of the user.

Figure 10:
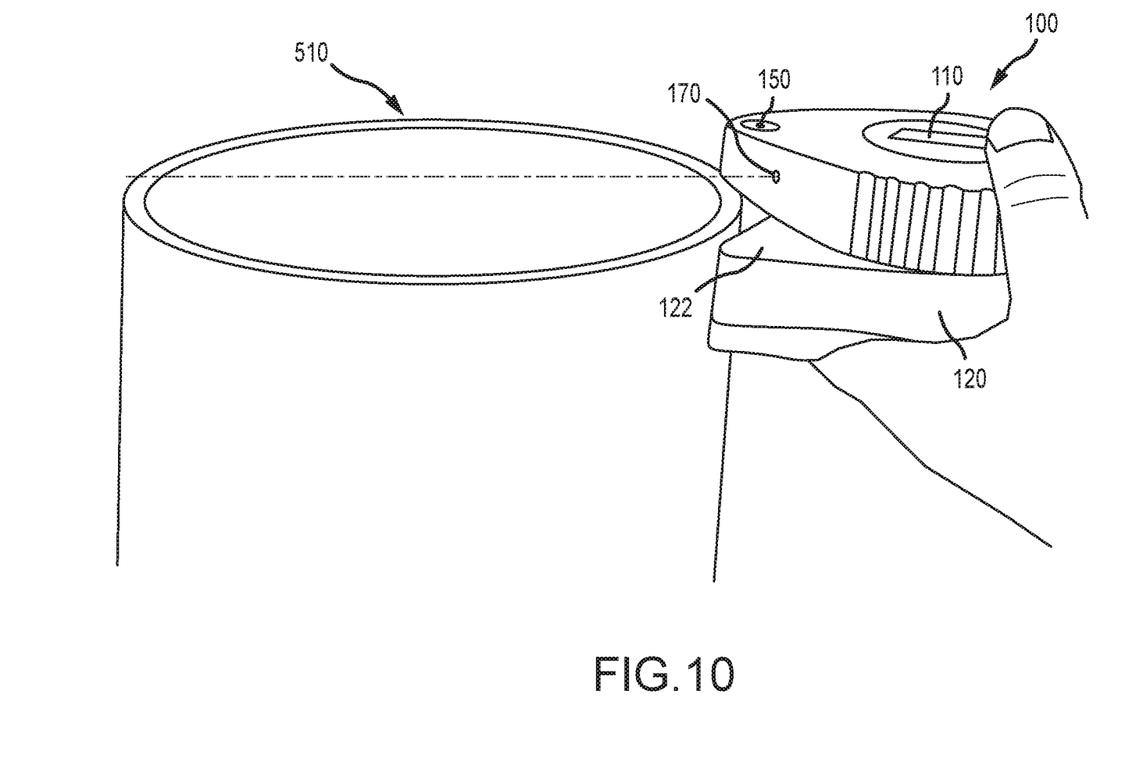
FIG. 10 shows another embodiment of a measuring tool according to the present disclosure being used to locate an opposite point along a circle.

Turning to FIG. 10, another method of using a measuring tool according to the present disclosure is shown. The depicted embodiment of the measuring tool 100 further comprises a horizontal laser 170 positioned on a lateral side of the exterior surface 111 of the top casing 110. In this method, the casings 110, 120 of the measuring tool 100 are first rotated with respect to one another from the default position into a second position provided by magnetic angle capture of the one or more magnets 180 magnetically coupling the casings 110, 120 together, as previously described. Next, the front lateral sides of the rotated casings 110, 120 are placed against a curved surface of a cylinder 510 and the horizontal laser 170 is activated. In this way, the horizontal laser 170 may act as and trace a diameter/radius through the structure 510, and therefore be used to find the opposite point along the circumference of the structure or the center of a half-circle structure. It should be appreciated, then, that the beam emitted by the horizontal laser 170 is configured to symmetrically bisect the offset of the casings 110, 120 in the second position provided by magnetic angle capture. In the embodiment of FIG. 10, the casings 110, 120 are rotated approximately 45° with respect to each other, although other angles may also be used depending on the orientation of the horizontal laser 170. In other words, so long as the casings 110, 120 are turned relative to one another into a set position that forms projections for pressing against a curved surface, the horizontal laser 170 may be specifically configured so that the laser beam it emits symmetrically bisects the angle formed between the casing projections (which is defined by the rotational displacement of the casings 110, 120 from the default position into this offset second set position of the measuring tool 100).

While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by exemplary embodiments and optional features, modification and variation of the concepts herein disclosed may be resorted to by those skilled in the art, and that such modifications and variations are considered to be within the scope of this invention as defined by the appended claims.

Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

The invention claimed is:

1. A measuring tool comprising:
   a first measuring tape, the first measuring tape being extendable and retractable relative to the measuring tool;
   a second measuring tape, the second measuring tape being extendable and retractable relative to the measuring tool;
   a level arranged on a top exterior surface of the measuring tool which indicates orientation relative to a horizontal plane; and
   a vertical laser arranged on a bottom exterior surface of the measuring tool;
   wherein the vertical laser is configured to project a laser beam, the laser beam projected by the vertical laser being substantially perpendicular to the horizontal plane of the level.

2. The measuring tool of claim 1, wherein the first measuring tape is housed within a first casing having a first interface surface, and the second measuring tape is housed within a second casing having a second interface surface.

3. The measuring tool of claim 2, wherein the first and second interface surfaces are configured to be detachably coupled together in at least one position.

4. The measuring tool of claim 3, wherein the first and second interface surfaces are configured to be detachably coupled together in at least two positions.

5. The measuring tool of claim 3, wherein the first casing and the second casing are mechanically coupled together in the at least one position.

6. The measuring tool of claim 3, wherein one or more magnets of the first interface surface are configured to form a magnetic coupling with one or more magnets of the second interface surface.

7. The measuring tool of claim 6, wherein at least two positions of the first casing relative to the second casing is provided by the magnetic coupling.

8. The measuring tool of claim 2, further comprising a calculator positioned on one of the first interface surface or the second interface surface.

9. The measuring tool of claim 1, further comprising a horizontal laser configured to project a laser beam, the laser beam projected by the horizontal laser being substantially parallel to the horizontal plane of the level.

10. A measuring tool comprising:
    a top casing and a bottom casing, the top casing having a first interface surface, the bottom casing having a second interface surface, the first interface surface and the second interface surface configured to detachably couple together in at least one position;
    the top casing having a first measuring tape, the first measuring tape being extendable and retractable relative to the top casing;
    the bottom casing having a second measuring tape, the second measuring tape being extendable and retractable relative to the bottom casing;
    a level arranged on an exterior surface of the top casing, the level indicating orientation relative to a horizontal plane; and
    a vertical laser arranged on an exterior surface of the bottom casing, the vertical laser configured to project a laser beam that is substantially perpendicular to the horizontal plane of the level.

11. The measuring tool of claim 10, wherein the first interface surface and the second interface surface are configured to detachably couple together in at least two positions.

12. The measuring tool of claim 10, wherein the top casing and the bottom casing are mechanically coupled together.

13. The measuring tool of claim 10, wherein one or more magnets of the first interface surface magnetically couple with one or more magnets of the second interface surface.

14. The measuring tool of claim 10, further comprising a calculator positioned on the second interface surface.

15. The measuring tool of claim 14, further comprising a display positioned on an exterior surface of the bottom casing, the display configured to display information from the calculator.

16. The measuring tool of claim 10, further comprising a horizontal laser configured to project a laser beam, the laser beam projected by the horizontal laser being substantially parallel to the horizontal plane of the level.

17. The measuring tool of claim 16, wherein the laser beam of the horizontal laser symmetrically bisects an angle formed by rotational displacement of the top casing and the bottom casing when the top casing is rotated relative to the bottom casing into a set position provided by coupling of the first interface surface and the second interface surface.

18. The measuring tool of claim 10, wherein the first measuring tape exits the top casing through a first opening, and the second measuring tape exits the bottom casing through a second opening, the first opening and the second opening being vertically aligned relative to the horizontal plane of the level.

19. The measuring tool of claim 10, further comprising one or more locking mechanisms that can prevent the first measuring tape and the second measuring tape from being extended or retracted relative to the measuring tool when in use.

20. The measuring tool of claim 10, wherein each of the first and second measuring tapes have a hook tab attached thereto by a swivel.

* * * * *